United States Patent [19]

Baker et al.

[11] Patent Number: 5,588,155

[45] Date of Patent: Dec. 31, 1996

[54] LIQUID IMPERVIOUS SURGICAL GOWN CUFF AND METHOD FOR MAKING THE SAME

[75] Inventors: Jerry W. Baker, Roswell; Timothy W. Reader, Suwanee, both of Ga.

[73] Assignee: Kimberly-Clark Corporation, Neenah, Wis.

[21] Appl. No.: 414,989

[22] Filed: Mar. 31, 1995

[51] Int. Cl.$^6$ ........................................................ A41B 7/00
[52] U.S. Cl. ............................ 2/123; 2/125; 2/51; 2/114
[58] Field of Search ............................... 2/69, 16, 46, 51, 2/123, 125, 82, 272, 59, 60, 114, 901, 87, 124, 113, 49.4, 115, 2.15; 156/160, 163, 164, 229; 604/385.1, 367, 385.2; 428/284, 286, 288, 289

[56] References Cited

U.S. PATENT DOCUMENTS

| | | | |
|---|---|---|---|
| 2,668,294 | 2/1954 | Gilpin | 2/114 |
| 3,045,815 | 7/1962 | Abildgaard | 206/63.2 |
| 3,692,618 | 9/1972 | Dorschner et al. | 161/72 |
| 3,727,239 | 4/1973 | Thompson | 2/123 |
| 3,849,241 | 11/1974 | Butin et al. | 161/169 |
| 3,868,728 | 3/1975 | Krewinski | 2/114 |
| 4,041,203 | 8/1977 | Brock et al. | 428/157 |
| 4,114,200 | 9/1978 | Smith et al. | 2/51 |
| 4,214,320 | 7/1980 | Belkin | 2/114 |
| 4,340,563 | 7/1982 | Appel et al. | 264/518 |
| 4,504,978 | 3/1985 | Gregory et al. | 2/114 |
| 4,573,991 | 3/1986 | Pieniak et al. | 604/385.2 |
| 4,586,196 | 5/1986 | White | 2/114 |
| 4,720,415 | 1/1988 | Vander Wielen et al. | 428/152 |
| 4,736,467 | 4/1988 | Schwarte et al. | 2/114 |
| 4,932,078 | 6/1990 | Jones et al. | 2/70 |
| 4,943,475 | 7/1990 | Baker et al. | 428/246 |
| 4,965,122 | 10/1990 | Morman | 428/225 |
| 4,981,747 | 1/1991 | Morman | 428/198 |
| 4,991,232 | 2/1991 | Taylor | 2/51 |
| 4,996,722 | 3/1991 | Jimenez et al. | 2/51 |
| 5,001,785 | 3/1991 | Heiman | 2/114 |
| 5,025,501 | 6/1991 | Dillon | 2/51 |
| 5,027,438 | 7/1991 | Schwarze et al. | 2/114 |
| 5,037,416 | 8/1991 | Allen et al. | 604/385.1 |
| 5,119,515 | 6/1992 | Altinger | 2/51 |
| 5,226,992 | 7/1993 | Morman | 156/62.4 |
| 5,320,891 | 6/1994 | Levy et al. | 428/108 |
| 5,336,545 | 8/1994 | Morman | 428/152 |
| 5,482,765 | 1/1996 | Bradley et al. | 428/286 |

FOREIGN PATENT DOCUMENTS

| | | |
|---|---|---|
| 3-066366 | 3/1991 | Japan. |
| 8907523 | 8/1989 | WIPO. |

OTHER PUBLICATIONS

Search Report for PCT/US96/02898 dated Jul. 17, 1996.

*Primary Examiner*—Amy B. Vanatta
*Attorney, Agent, or Firm*—David J. Alexander

[57] ABSTRACT

A surgical gown sleeve formed from a liquid impermeable elastic necked-stretched laminate is disclosed. The elastic necked-stretched laminate may include an elastic layer captured between two necked-stretched spunbond layers. The disclosed elastic necked-stretched laminate may also be incorporated in a variety of products, such as stockinettes, shoe covers and foot covers.

8 Claims, 2 Drawing Sheets

LIQUID IMPERVIOUS SURGICAL GOWN CUFF AND METHOD FOR MAKING THE SAME

FIELD OF THE INVENTION

This invention relates to gowns and other garments and particularly to surgical gowns and methods for making the same. More particularly, this invention relates to improved cuff structures. The use of such structures provides improved comfort, barrier properties, and protection to the wearer's body and particularly to those portions of the wearer's body overlaid by such cuffs.

BACKGROUND OF THE INVENTION

As is generally known, sterile surgical gowns are designed to greatly reduce, if not prevent, the transmission through the gown of liquids and biological contaminates which may become entrained therein. In surgical procedure environments, such liquid sources, include aqueous liquids such as the gown wearer's perspiration, patient liquids such as blood, salvia, perspiration and life support liquids such as plasma and saline.

Many surgical gowns were originally made of cotton or linen and were sterilized prior to their use in the operating room. These gowns, however, permitted transmission or "strike-through" of many of the liquids encountered in surgical procedures. These gowns were undesirable, if not unsatisfactory, because such "strike through" established a direct path for transmission of bacteria and other contaminates to and from the wearer of the gown. Furthermore, the gowns were costly, and, of course, laundering and sterilization procedures were required before reuse.

Disposable surgical gowns have largely replaced linen surgical gowns. Because many surgical procedures require generally a high degree of liquid repellency to prevent strike-through, disposable gowns for use under these conditions are, for the most part, made entirely from liquid repellent fabrics.

In an effort to provide greater comfort, disposable surgical gown manufacturers generally incorporate sufficient material into the construction of the surgical gown so that the gown is generally loose fitting. However, portions of the gown, such as the cuffs and collar, may be designed to form-fit about the respective portions of the wearer's body. As such, the cuffs and collar may be elastic. Elastic cuffs and collars may be formed from a variety of materials. Examples of such materials include cotton, knits and polyester knits.

In some surgical procedures, where the risk of insult to the surgical gown is low, surgical gowns having cuffs formed from liquid permeable or liquid absorbent fabrics may provide adequate protection for the wearer. However, in other surgical procedures, where the risk of insult to the surgical gown is high, additional protection may be desirable. In some instances, to provide additional protection, a glove is sometimes worn which is sized to overlap the cuff and a portion of the sleeve.

However, when the sleeve cuff is formed from liquid retentive fabrics and is over-gloved by a surgical glove, perspiration formed within the gown sleeve may collect in the cuffs. As the amount of perspiration retained in the cuff increases, the cuff material may become saturated with perspiration such that the liquid may migrate to the cuff/glove interface. Furthermore, the wearer's hand and arm movement may cause the retained perspiration to migrate beyond the cuff and into the portion of the sleeve adjacent the cuff. Strike-through may then occur when liquids generated during the surgical procedure contact the wearer's perspiration in the area of the sleeve and cuff.

Additionally, in instances where the wearer's perspiration has not migrated beyond the glove but has saturated or soaked the cuff material, there still remains the risk of the wearer being contacted by liquids which have been generated during the surgical procedure. This is so because, liquids on the outer surface of the gown sleeve may travel down the sleeve and contact the perspiration laden cuff before or during the removal of the glove and or gown.

In other instances, surgical gowns used in high insult surgical procedures may also be provided with cuffs formed from liquid repellent materials. However, liquids, generated during surgery which by-pass the glove and reside on the gown sleeve may contact the wearer during removal of the gown and/or glove.

Therefore, there exists a need for surgical gowns and methods of making the same which provides improved barrier protection and, particularly, improved barrier protection for the wearer's wrist, ankles, neck and adjacent areas of the wearer's body while at the same time avoiding the problems associated with conventional cuff and/or collar designs.

SUMMARY OF THE INVENTION

In response to the above problems encountered by those skilled in the art, the present invention provides a cuff or collar formed from an elastic necked-bonded laminate. The elastic necked-bonded laminate includes at least one neckable material layer and at least one elastic liquid barrier layer. The elastic liquid barrier layer may be formed from an elastic film which is joined to the neckable material layer.

In another embodiment, the present invention provides a cuff or collar formed from an elastic necked-bonded laminate having at least two neckable material layers separated by an elastic liquid barrier layer. The elastic liquid barrier layer is formed from an elastic film which is joined to the neckable material layers. The neckable material layers may be formed from a nonwoven web. The neckable material layers may be aqueous liquid retentive or aqueous liquid repellent or one of the neckable material layers may be aqueous liquid retentive and the other neckable material layer may be aqueous liquid repellent. When the neckable material layer is aqueous liquid retentive, aqueous liquids, such as blood, saline, etc., which come in contact therewith are retained therein. At the same time, liquid migration between the neckable material layers is prevented by the elastic liquid barrier layer.

In another embodiment, a stockinette may be formed from an elastic necked-bonded laminate which includes at least two neckable material layers separated by one at least one elastic liquid barrier layer. The elastic liquid barrier layer is formed from an elastic barrier film and is joined to the neckable material layers. The neckable material layers may be aqueous liquid retentive or aqueous liquid repellent or one of the neckable material layers may be aqueous liquid retentive and the other neckable material layer may be aqueous liquid repellent. When the neckable material layer is aqueous liquid retentive, aqueous liquids or a portion thereof, such as blood, saline, etc., which come in contact therewith are retained therein. At the same time, liquid migration between the neckable material layers is prevented by the elastic liquid barrier layer.

Additionally, the elastic necked-bonded laminate of the present invention may also be used in foot wear for providing a form fitting region, such as, the area about the wearer's ankle.

DETAILED DESCRIPTION OF THE INVENTION

Figure 1:
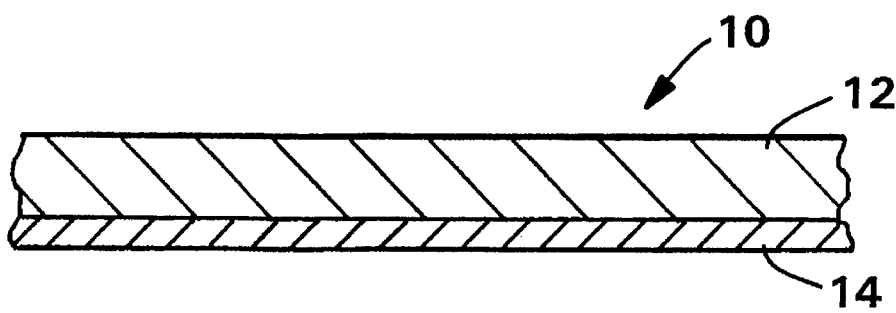
FIG. 1 is a cross-sectional view of an elastic laminate.

Several terms may be used to describe affixing an elastic necked-bonded laminate to another structure. These terms include "join", "secure", "attach" and derivatives and synonyms thereof. The affixing of the elastic necked-bonded laminate to another structure may be accomplished by any of several conventional methods. By way of example and not limitation, these methods include stitching, gluing, heat sealing, zipping, snapping, sonic, ultrasonic or thermal bonding or using a hook and loop fastening system and other methods familiar to those skilled in the art.

The term "elastic" is used herein to mean any material which, upon application of a biasing force, is stretchable, that is elongatable, to a stretched, biased length which is at least about 160 percent of its relaxed unbiased length, and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be stretched by more than 60 percent of their relaxed length, for example, 100 percent or more, and many of these will recover to substantially their original relaxed length, for example to within 105 percent of their original relaxed length, upon release of the stretching force.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein the term "microfibers" means small diameter fibers having an average diameter not greater than about 100 microns, for example, having a diameter of from about 0.5 microns to about 50 microns, more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web (meltblown web) of randomly disbursed meltblown fibers. Such a process is disclosed, for example, in U.S. Pat. No. 3,849,241 to Butin, the disclosure of which is herein incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spunbonded nonwoven webs is illustrated in patents such as, for example, in U.S. Pat. No. 4,340,563 to Appel et al., and U.S. Pat. No. 3,692,618 to Dorschner et al. The disclosures of both of these patents are herein incorporated by reference.

As used herein, the terms "necking", "neck stretching" or "necked-stretched" interchangeably refer to a method of elongating a neckable material, such as a nonwoven fabric, generally in the machine direction, to reduce its width (cross-machine direction dimension) in a controlled manner to a desired amount. The controlled stretching may take place under cool, room temperature or greater temperatures and is limited to an increase in overall dimension in the direction being stretched up to the elongation required to break the fabric. When relaxed, the web retracts toward its original dimensions. Such a process is disclosed, for example, in U.S. Pat. No. 5,336,545 to Morman which is therein incorporated by reference.

As used herein, the term "necked material" refers to any material which has been narrowed in at least one dimension by the application of a tensioning force, such as for example, neck stretching.

As used herein, the term "neckable material" means any material which can be necked.

As used herein, the terms "impermeable to liquids", "impermeable to aqueous liquids", "aqueous liquid impervious", "liquid barrier" and "liquid impervious", when describing a material, mean such materials pass the ASTM ES 21-92 "Emergency Standard Test Method for Resistance of Protective Clothing Materials to Synthetic Blood".

Turning now to drawings and with reference to FIG. 1, an elastic necked-bonded laminate is indicated by reference numeral 10. The elastic necked-bonded laminate 10 includes at least one neckable material layer 12 joined to at least one elastic liquid barrier layer 14.

The elastic layer 14 is desirably impermeable to liquids and particularly, impermeable to aqueous liquids. An example of such an elastic film is a film formed from KRATON® polymers. Generally, KRATON polymers may be described as A-B-A' (polystyrene/poly(ethylene-butylene)/polystyrene) block copolymers. KRATON polymers are available from the Shell Chemical Company. Particularly useful KRATON polymers include KRATON G 2755-100 and KRATON G 2740X. Desirably, the thickness of the elastic layer 14 may range from about 0.5 to about 5 mils, and particularly from about 0.5 to about 4 mils and more particularly from about 1 to about 3 mils.

The neckable material layer 12 is formed from a necked material. The neckable material layer 12 may be liquid repellent or liquid retentive. More particularly, the neckable material layer 12 may be aqueous liquid repellent or it may be aqueous liquid retentive. The neckable material layer 12 desirably may be formed from any suitable polymeric material.

As used herein, the term "polymeric material" means a synthetic or natural polymer material, although the former is more likely to be employed in the present invention. As used herein, the term "polymeric fabric" means a fabric prepared from any polymer material capable of being formed into a fabric.

Examples, by way of illustration only, of natural polymeric materials include, cotton, silk, wool, and cellulose. Synthetic polymeric materials, in turn, can be either thermosetting or thermoplastic materials.

Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

Examples of thermoplastic polymers include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(ε-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly-(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly (4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; copolymers of the foregoing, such as acrylonitrile-butadiene-styrene (ABS) copolymers, and the like. In certain embodiments, the polymeric fabric will be prepared from a polyolefin. In other embodiments, the polyolefin will be polypropylene.

The term "fabric" is used broadly herein to mean any fibrous material which has been formed into a web. That is, the fabric is composed, at least in part, of fibers of any length. Thus, the fabric can be a woven or nonwoven web, either of which is readily prepared by methods well-known to those having ordinary skill in the art. Moreover, the fabric can consist of a single layer or multiple layers. In addition, a multilayered fabric can include films, scrim, and other non-fibrous materials.

Nonwoven webs formed from polyolefin-based fibers may be used in forming the neckable material layer 12. Other non-limiting examples of fabrics suitable for use as the neckable material layer 12 include necked-stretched polyolefin spunbond webs or necked-stretched polyolefin meltblown webs.

With continued reference to FIG. 1, the elastic layer 14 may further overlie all or substantially all the neckable material layer 12. Alternatively, the elastic layer 14 may also overlie selected portions of the neckable material layer 12. In the later instance, the resulting elastic laminate may include selected areas or zones of elasticity and non-elasticity and liquid permeability and liquid non-permeability. An example of an elastic laminate (not illustrated) having selected zones of elasticity and non-elasticity would be an elastic laminate formed from at least one neckable material layer having at least two elastic liquid impervious layers secured to the neckable material layer such that the elastic liquid impervious layers are separated by a distance. In this example, the portions of the laminate including a portion of one of the elastic liquid impervious layers would be elastic while those portions of the laminate not including a portion of one of the elastic liquid impervious layers would not be elastic. Another example of an elastic laminate (not illustrated) having selected zones of elasticity and non-elasticity would be an elastic laminate formed from at least one neckable material layer and at least one elastic liquid impervious layer joined to the neckable material layer such that the elastic liquid impervious layer does not completely overly the neckable material layer.

Figure 2:
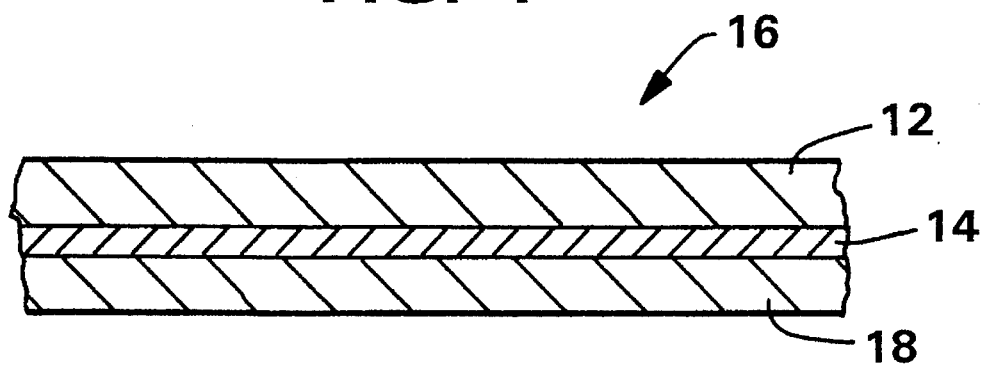
FIG. 2 is a cross-sectional view of another elastic laminate.

Referring now to FIG. 2, another embodiment 16 of the invention is similar to the elastic necked-bonded laminate 10 illustrated in FIG. 1 with the exception that the elastic layer 14 is sandwiched between the neckable material layer 12 and a layer 18. The layer 18 is desirably secured to the elastic layer 14. Desirable, the layer 18 is formed from a neckable material which is suitable for forming the neckable material layer 12.

Figure 3:
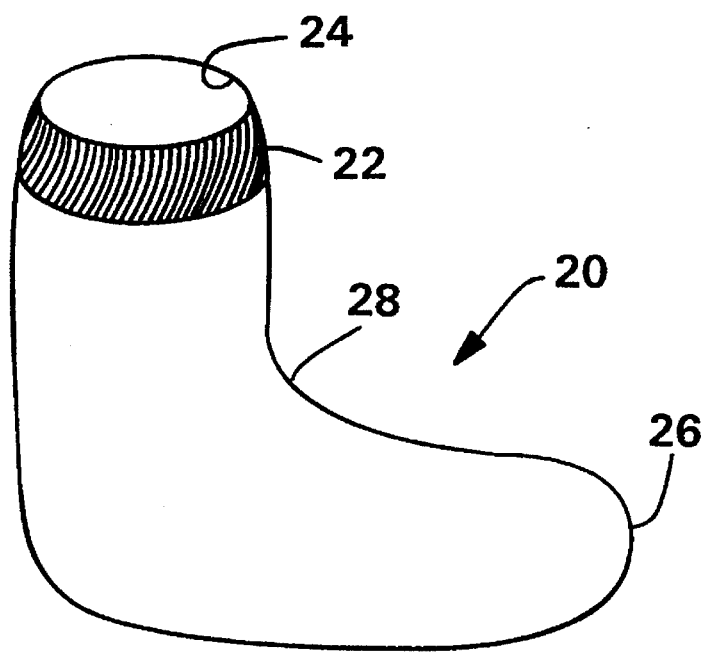
FIG. 3 is a perspective view of a foot receiving article.

Referring now to FIG. 3, a shoe or foot receiving article 20, such as a sock or a shoe cover, is illustrated. The foot receiving article 20 is generally L-shaped and tubular in construction. An elastic cuff 22 of the foot receiving article 20 defines an opening 24 for receiving a foot. Another end 26 of the foot receiving article 20 is closed and is adapted to overlie a wearer's toes. Portions of the foot receiving article 20 between the cuff 22 and the closed end 26 defines a body 28 which may be formed from woven or non-woven fabrics. The elastic cuff 22 may be formed from either the elastic laminate 10 or 16 described above and is secured to the body 28. The elastic cuff 20 generally functions to expand and contract in concert with a wearer's movement in a form fitting manner.

Figure 4:
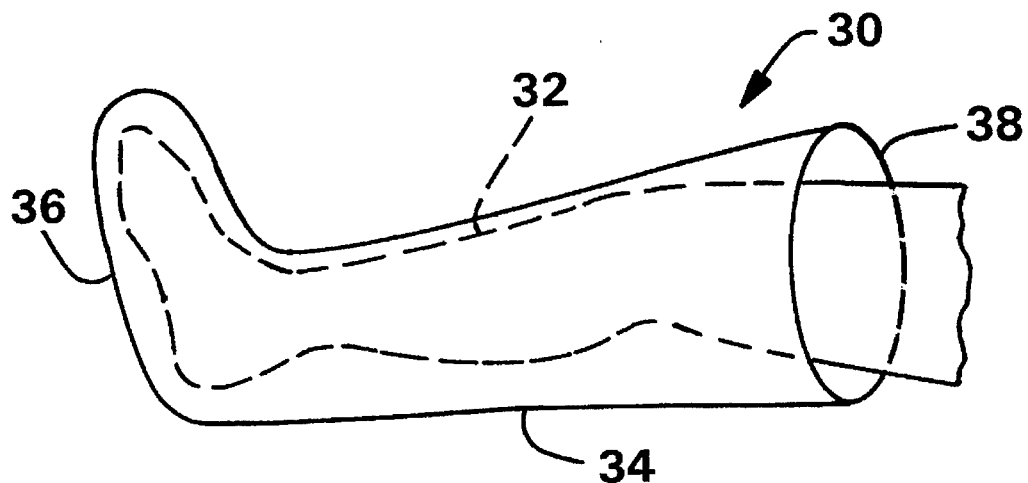
FIG. 4 is a perspective view of a stockinette.

FIG. 4 illustrates a stockinette 30 overlying a portion of a leg 32. The stockinette 30 is generally L-shaped and tubular in construction and includes a leg portion 34 and a foot portion 36. The leg portion 34 terminates at one end with an annular leg receiving opening 38. The stockinette 30 may be formed from either the elastic necked-bonded laminate 10 or 16 and may function to expand and contract in concert with a wearer's movement in a form fitting manner.

Figure 5:
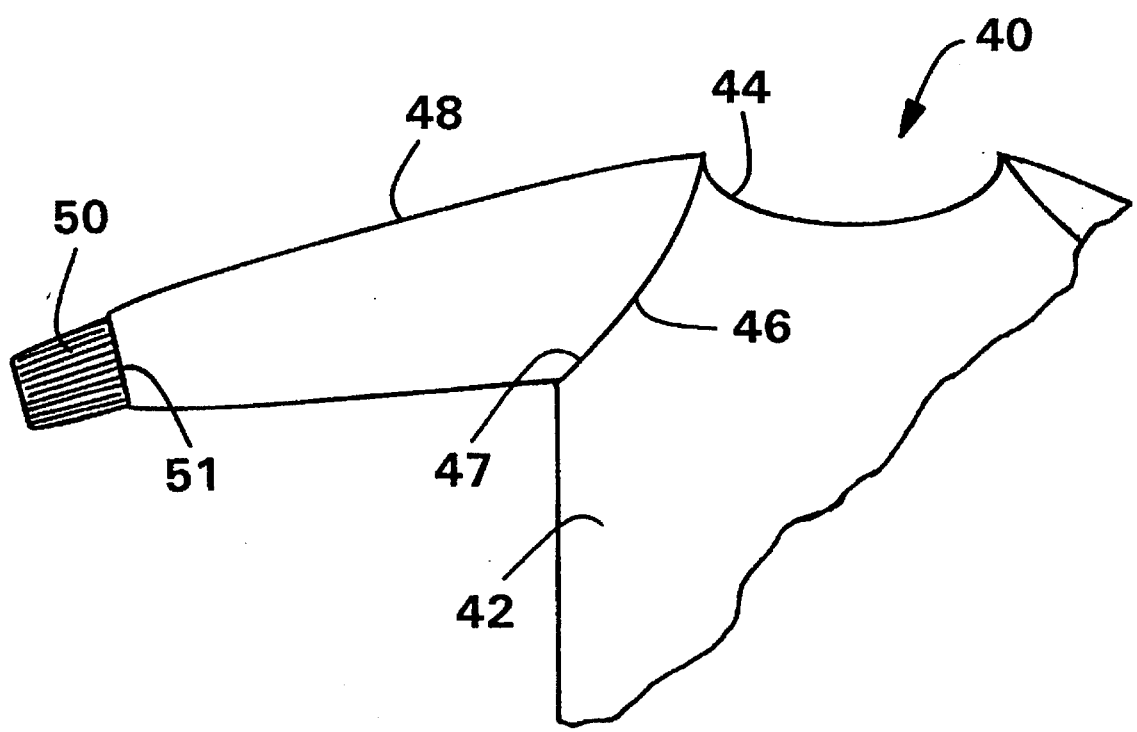
FIG. 5 is a fragmentary plan view of a surgical gown.

FIG. 5 illustrates a portion of a surgical gown 40. The surgical gown includes a body 42, portions of which define a neck opening 44 and a sleeve opening 46. One end 47 of a sleeve 48 is secured to the body 42 about the sleeve opening 46 and a cuff 50 is secured to the other end 51 of the sleeve 48. The cuff 50 may be formed from either the elastic necked-bonded laminate 10 or 16 and may function to expand and contract in concert with a wearer's movement in a forming fitting manner.

EXAMPLES

The following examples demonstrate the embodiment of the present invention illustrated in FIG. 2. Elasticity and stretch testing for this elastic necked-bonded laminate are reported. Such examples, however, are not to be construed as limiting in any way either the spirit or scope of the present invention.

Several six inch (cross-machine direction dimension) by four inch (machine direction dimension) elastic necked-bonded laminate samples were evaluated. These elastic necked-bonded laminates samples may generally be described as necked stretched spunbond/liquid impervious film/necked stretched spunbond laminates. The necked stretched spunbond layers were prepared by neck stretching two separate 0.85 ounce per square yard (osy) spunbond webs to form two separate 1.6 osy spunbond webs. Each spunbond web was formed from polypropylene which included 2% weight titanium dioxide. The film was a 1 mil film formed from KRATON G 2755-1000 polymer. The basis weight of each elastic necked-bonded laminate sample was approximately 4 osy.

Three sample sets which included three samples per set of the above described elastic necked-bonded laminate were evaluated. For the first set of samples, the force (in pounds) required to elongate each of these samples in the cross direction to two times (2×) their original length and the recovery length after 2× elongation of each of these samples is reported in Table I.

The recovery length, expressed in inches, was obtained by measuring then marking a one inch segment on several relaxed samples. A force was applied sufficient to elongate these marked samples to two times their relaxed length. After elongation was achieved, the force was removed and the sample allowed to relax. The originally marked one inch segment on each of the samples was then remeasured. The remeasured length is reported under "Recovery Length" in TABLE I. A Sintech 2/S tensile tester, Kimberly-Clark Corporation asset tag no. 04883, was used to obtain the results reported in TABLE I.

TABLE I

| ELASTIC NECKED-BONDED LAMINATE | | |
|---|---|---|
| Set 1 Sample | 2× (lbs) | Recovery Length (inches) |
| 1 | 7.140 | 1.2 |
| 2 | 5.566 | 1.1 |
| 3 | 5.787 | 1.1 |

The results reported in Table I, under the heading "Recovery Length" indicate that these samples recovered to between 110% to 120% of their original un-stretched length.

For the second set of samples, the force (in pounds) required to elongate each of these samples in the cross direction to three times (3×) their relaxed length and the recovery length after 3× elongation of each of these samples is reported in Table II.

The recovery length, expressed in inches, was obtained by measuring then marking a one inch segment on several relaxed samples. A force was applied sufficient to elongate these marked samples to three times their relaxed length. After elongation was achieved, the force was removed and the sample allowed to relax. The originally marked one inch segment on each of the samples was then remeasured. The remeasured length is reported under "Recovery Length" in TABLE II. As for the first set of samples, a Sintech 2/S tensile tester, Kimberly-Clark Corporation asset tag no. 04883, was used to obtain the results reported in TABLE II.

TABLE II

| ELASTIC NECKED-BONDED LAMINATE | | |
|---|---|---|
| Set 2 Sample | 3× (lbs) | Recovery Length (inches) |
| 1 | 14.336 | 1.15 * |
| 2 | 11.801 | 1.2 * |
| 3 | 12.607 | 1.1 * |

* - The spunbond web ruptured or failed prior to the samples reaching 3× elongation. However, KRATON film did not fail at 3× elongation.

The results reported in Table II, under the heading "Recovery Length" indicate that these samples recovered to between 110% to 120% of their original un-stretched length.

For the third set of samples, the force (in pounds) required to elongate each of these samples in the cross direction to four times (4×) their original length and the recovery length after 4× elongation of each of these samples is reported in Table III.

The recovery length, expressed in inches, was obtained by measuring then marking a one inch segment on several relaxed samples. A force was applied sufficient to elongate these marked samples to four times their relaxed length. After elongation was achieved, the force was removed and the sample allowed to relax. The originally marked one inch segment on each of the samples was then remeasured. The remeasured length is reported under "Recovery Length" in TABLE III. As for the first set of samples, a Sintech 2/S tensile tester, Kimberly-Clark Corporation asset tag no. 04883, was used to obtain the results reported in TABLE III.

TABLE III

| ELASTIC NECKED-BONDED LAMINATE | | |
|---|---|---|
| Set 3 Sample | 4× (lbs) | Recovery Length (inches) |
| 1 | 14.496 | 1.2 * |
| 2 | 14.998 | 1.2 * |
| 3 | 13.949 | 1.2 * |

* - The spunbond web ruptured or failed prior to the samples reaching 4× elongation. However, KRATON film did not fail at 4× elongation.

The results reported in Table III, under the heading "Recovery Length" indicate that these samples recovered to 120% of their original un-stretched length.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and any equivalents thereto.

What is claimed is:

1. A surgical gown comprising:
a sleeve and a cuff secured to the sleeve; wherein the cuff is formed from an elastic necked-stretched laminate; and wherein the elastic necked-stretched laminate includes a neckable material layer joined to an elastic aqueous liquid impervious layer.

2. The surgical gown of claim 1 wherein the neckable material layer is formed from a necked-stretched spunbond web.

3. The surgical gown of claim 1 wherein the neckable layer is aqueous liquid retentive.

4. The surgical gown of claim 1 further including another neckable material layer secured to the elastic aqueous liquid impervious layer such that the neckable material layers are separated by the elastic aqueous liquid impervious layer.

5. The surgical gown of claim 4 wherein the other neckable material layer is aqueous liquid retentive.

6. The surgical gown of claim 4 wherein the other neckable material layer is formed from a necked-stretched spunbond web.

7. The surgical gown of claim 1 wherein the elastic aqueous liquid impervious layer is a film having a thickness of between about 0.5 mil to about 5 mils.

8. The surgical gown of claim 4 wherein the neckable material layers are aqueous liquid retentive.

* * * * *